United States Patent [19]

Ridley

[11] 3,843,845

[45] Oct. 22, 1974

[54] ELECTRONIC KEY TELEPHONE SYSTEM

[75] Inventor: Peter Ridley, Ottawa, Ontario, Canada

[73] Assignee: Northern Electric Company Limited, Montreal, Quebec, Canada

[22] Filed: Sept. 11, 1972

[21] Appl. No.: 288,095

[52] U.S. Cl. .................................................. 179/99
[51] Int. Cl. ............................................ H04m 1/00
[58] Field of Search ....................................... 179/99

[56] References Cited

UNITED STATES PATENTS

| | | | |
|---|---|---|---|
| 3,549,820 | 11/1970 | Knollman | 179/99 |
| 3,637,939 | 1/1972 | Fabiano, Jr. et al. | 179/99 |
| 3,647,980 | 3/1972 | Fabiano, Jr. et al. | 179/99 |
| 3,655,915 | 4/1972 | Liberman et al. | 179/2 DP |
| 3,701,854 | 10/1972 | Anderson et al. | 179/99 |

*Primary Examiner*—Kathleen H. Claffy
*Assistant Examiner*—Mitchell Saffian
*Attorney, Agent, or Firm*—John E. Mowle

[57] ABSTRACT

An electronic key telephone system which utilizes only a single communication line and a single bi-directional control bus between each of a plurality of station sets and a central control unit to provide all services for the system. The system is organized to first transmit an address from the central control unit to a selected station set which is then followed by the transmission of status information from the central control unit to the station set or vice versa. Because of this organization, the system is readily adapted to provide auxiliary services such as computer and information retrieval and display.

5 Claims, 10 Drawing Figures

PATENTED OCT 22 1974 3,843,845

SHEET 1 OF 9

ELECTRONIC KEY TELEPHONE SYSTEM

BACKGROUND OF THE INVENTION

This invention relates to telecommunications systems and in particular to business and residential wired communication systems providing services such as those available from key telephone systems, intercommunication systems and private branch exchange (PBX) systems. The invention is also applicable to data communication systems, accounting machines, desk calculators, computer systems and information retrieval and display systems.

With the increasing use of the telephone in the business world, a need developed for service features beyond those provided by the basic single-line telephone. This lead to the development of telephone systems providing user control of operation by means of keys, with visual indication of the systems status on lamps. These key telephone systems (KTS) are customer controlled telephone switching systems permitting the use of a single telephone set on more than one line by operating service selection pushbuttons or keys.

Features of such systems include:

multi-line pick-up — originating or answering calls on any line available at the telephone set;

call holding — holding an incoming call while making or receiving a call on another line;

multi-line appearance — a line may be picked up by more than one telephone set; and intercommunications — communication between persons on the same system can be carried out using the telephone set on an intercom line without tying up an outside line.

Existing KTS are based on the principle of line switching at the station set. This means that all lines, each consisting of a pair of communication wires, for which pick-up is provided, must terminate in the set, along with four associated control wires, thereby making a total of six wires per line.

At the central key service unit, there is a line unit for each line on the system. Line units contain the circuits necessary for the features associated with each line and each is connected, by six wires, to all telephones using the line. Consequently, a standard six-button key telephone set could use as many as 40 or more individual conductors to provide the full complement of features.

It is evident that the concept of centralized switching applied to a Key Telephone System would greatly reduce the conductor requirements between the station set and the central equipment.

Canadian Pat. No. 876,374 issued July 20, 1971 and invented by H. P. Anderson et al., describes an "Electronic Key Telephone System" in which the switching function is concentrated in the central switching equipment with only one pair of speed wires to each station set. However, for a six-button set, the system also includes 15 conductors in a data bus which is used to transmit supervisory and control information between the individual station sets and the common control unit.

Although not mentioned, additional conductors may also be required to provide power between the central unit and the station set. It is evident therefore that this system provides only a partial reduction in the number of conductors required to provide communications between the central control and station sets. In addition, such a system is restricted to telephone service only and does not readily lend itself to adaptation for additional facilities such as data communications, computer and information retrieval systems.

SUMMARY OF THE INVENTION

It has been found that a single bidirectional two-wire control bus can be utilized to transfer all data between a central control unit and each station. With an additional two pairs for communications and power, the present invention can provide all telephone service and in addition, computer facilities utilizing a total of any six conductors.

Thus, in accordance with the present invention there is provided a key telephone system for connection to a number of telephone lines. The system comprises a plurality of telephone stations each including line selectors corresponding to individual lines. Also included are central switching means and central control means. Each of the telephone stations is connected to the central switching means by a single communication path and to the central control means by a single data path. The central control means includes transmission means for periodically sending a status address to selected telephone stations, means responsive to a particular status address for transmitting central-control status information to the selected station and means responsive to another status address for receiving station status information from the selected station. The central control means also includes a memory for storing the status information and means responsive to the station status information from the selected station for controlling the central switching means to connect the communications path of the selected station to one of the telephone lines. Each station of the system includes a means for decoding the status address, means responsive to the central-control status information for displaying the status at the selected station, and means responsive to said another status address for transmitting the station status information to the central control means over the single data path.

In a particular embodiment of the invention, each of the line selectors is associated with a pair of status lights, while each of the telephone stations include a means responsive to the central-control status information from the memory for actuating one of the pairs of status lights to indicate the status of an individual line at all the stations, and for actuating the other of the pair of status lights to indicate the selection of a line at the same station. By utilizing two status lamps for each line, the need for interlocking line selectors or keys is negated. This considerably reduces the mechanical complexity of each telephone station.

In still another embodiment of the invention, each telephone station includes a pushbutton dial having a digital output to derive station status information which is transmitted over the single data path connected with the respective station. In addition, the central control includes a means for generating dial signals on each of the telephone lines and means for controlling the dial signal generating means of a selected line in response to the station status information received from the digital output of the pushbutton dial. With such a system costly dial signal generators are only required for each outgoing telephone line from the system, rather than at each telephone within the system. Thus, a relatively large number of station sets can be serviced by a few dial signal generators.

In still another particular embodiment of the invention, each telephone station has a switch-hook which is independent of the communications path. The station also includes a means responsive to the switch-hook for transmitting station status information to the central control means. Since all addresses and status information are transmitted from the central control means to each station via a single data path, the addition of services other than basic telephone communications can be readily incorporated in the basic system. Thus, the display of numerical information such as computer results can be readily directed to a visual display, simply by adding additional status addresses followed by central-control status information. In previous systems this concept was not obtainable without the addition of more conductors to the data bus since individual conductors were designated for particular functions. Because of the central-control aspect of this Key Telephone System (KTS), it is readily adapted to integration with a Private Branch Exchange (PBX). Consequently, features of both existing KTS and PBX systems can be incorporated in a single system. The system thus provides a versatile Key Telephone System utilizing only six conductors between each telephone station and the central switching and control means.

BRIEF DESCRIPTION OF THE DRAWINGS

An example embodiment of the invention will now be described with reference to the accompanying drawings in which.

DESCRIPTION OF THE PREFERRED EMBODIMENT

Figures 1, 8:
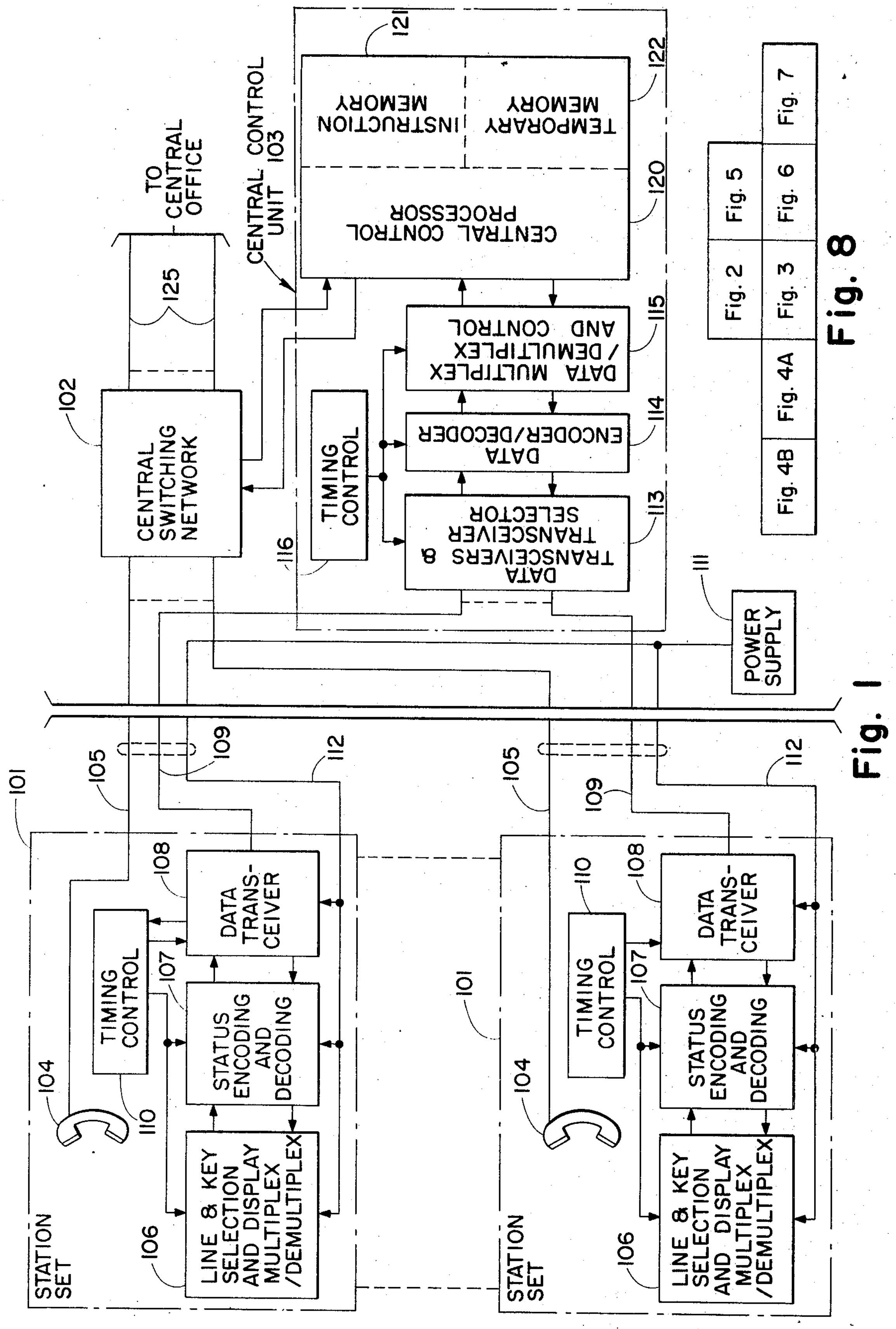
FIG. 1 illustrates a block diagram of the major components of an electronic key telephone system in accordance with the present invention.

Referring to FIG. 1, the basic components of the electronic key telephone system comprise a plurality of multi-key station sets 101 each of which is connected to a central switching network 102 and a central control unit 103. Each station set 101 includes a telephone handset 104 connected by a single communication path or line 105 to the central switching network 102. The station sets 101 also include a line and key selection and display multiplex/demultiplex unit 106 that both transmits and receives information to and from a status encoding and decoding unit 107, the input and output of which are connected to a data transceiver 108 (transmitter/receiver). Each data transceiver 108 is connected to the central control unit 103 by a single data path or line 109. Each of the units 106, 107 and 108 receives timing-pulse signals from a timing control generator 110. In addition, a common power supply 111, located beside the central control unit 103, feeds power to each of the station sets 101 via power supply leads 112.

Data information fed over the data path 109 is received by the data transceiver and transceiver selector unit 113 in the central control unit 103. The output of the unit 113 is then coupled through a data encoder/decoder unit 114 to a data multiplex/demultiplex and control unit 115. Units 113, 114 and 115 receive timing pulse signals from a timing control generator 116. The central control unit 103 also includes a central control processor 120 having an instruction memory 121 and a temporary memory 122 which transmit information through the units 113, 114 and 115 to each of the station sets 101 in sequence. The central control unit 103 first transmits an address to the selected one of the station sets 101 which is then followed by either central control status information generated by the central control unit 103 or by station status information generated in the selected one of the station sets 101. Information received from the station sets 101 is fed through the units 113, 114 and 115 to the central control processor 120.

The central switching network 102 is connected to a central office (not shown) by a plurality of telephone lines 125 and to the central control processor 120. The latter unit 120, which receives status information from both the station sets 101 and from the telephone lines 125, controls the interconnection of the communication lines 105 and the telephone lines 125.

By performing the switching function of the various station sets 101 in the central switching network 102, it is evident that only the single telephone communication path 105, comprising a pair of wires, is required between each of the sets 101 and the switching network 102 in order to provide interconnection with a plurality of telephone lines 125. With an additional pair of wires for the data path 109 and the power supply leads 112, all facilities for such an electronic key telephone system including auxiliary services can be provided with a maximum of six wires between each of the station sets 101 and the central switching network 102 and control unit 103. In order to better understand the operation of the electronic key telephone system, a description of the pulse sequence utilized in the system will be given first, with particular reference to FIG. 9.

Binary digital information (i.e., 0's or 1's) is transmitted from the station set 101 to the central control unit 103 and vice versa on a repetitive time division multiplex (TDM) basis in which a complete information transfer interval comprises two cycles:

MODE "0" — An 11 bit address, mode bit "0," parity bit $\rho$ and word sync bits are first transmitted from the central control unit 103 to the selected one of station sets 101; followed by a twelve bit reply, parity bit $\rho$ and word sync bits transmitted from the station set 101 to the central control unit 103; and MODE "1" — An 11 bit address, mode bit "1," parity bit $\rho$ and word sync bits are first transmitted from the central control unit 103 to the selected one of station sets 101; immediately followed by a twelve bit reply, parity bit $\rho$ and word sync bits also transmitted from the central control unit 103 to the selected station set 101.

Each information bit is contained within a word $P_0$ through $P_{14}$. The words are further divided into bits $B_0$, $B_1$ and $B_2$, with the exception of $P_{13}$ which includes an additional bit $B_3$, and $P_{14}$ which contains only a single bit $B_0$ except when it is utilized to generate a pause between transmit and receive whereupon it includes additional bits $B_1$ and $B_2$. Each word P, excluding $P_{13}$ is subdivided into three B's such that $B_0 = 1$, $B_1 = 0$ and $B_2$ x δ (information). During $P_{13}$ and $P_{14}$ synchronization information bits are transmitted as follows:
$P_{13}$ ($B_0 = 1, B_1 = 1, B_2 = 1, B_3 = O$); $P_{14}$ ($B_0 = 0$), thus yielding a unique five bit synchronization word 11100.

Each bit is further divided by a three-state counter to generate pulses $I_0$ through $I_7$. Initial pulse $I_0$ is utilized for triggering, and strobe pulse $I_4$ is generated in the middle of each B during which incoming data bits are sampled.

The detailed structure of the electronic key telephone system will be readily apparent from the following circuit description of its function and operation during the various operating modes, when taken in conjunction with the accompanying drawings. Conventional Boolean Algebra symbols will be used to describe some of the composite signals. Thus $INFO \cdot RX \cdot I_4$ means information signals (INFO) received (RX) during the strobe interval ($I_4$). Likewise, $\overline{MODE}$ means an inverted mode signal.

DESCRIPTION OF THE STATION SET

Figure 2:
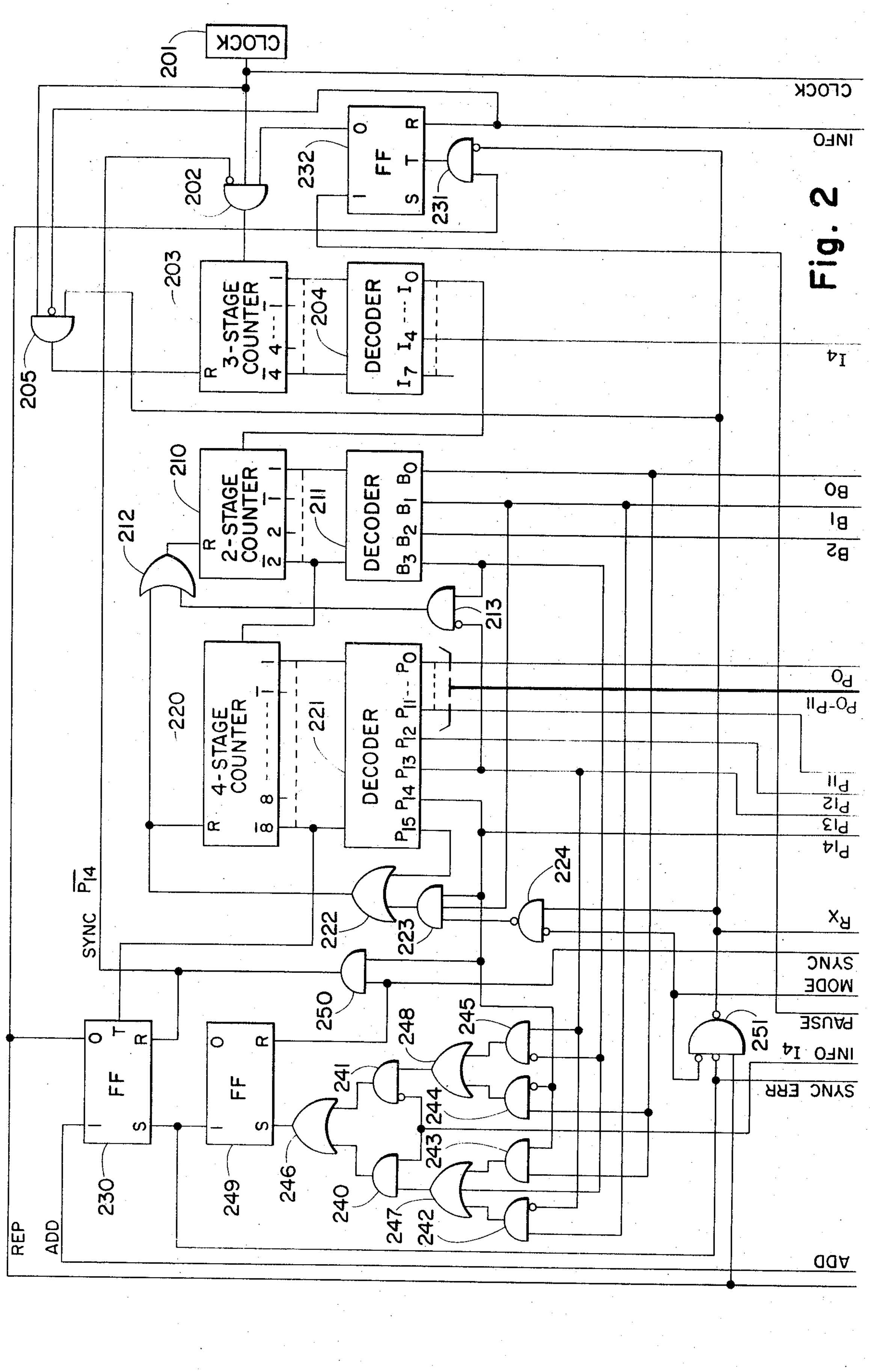
FIGS. 2 through 7, when arranged in accordance with FIG. 8, illustrate a detailed block and schematic circuit diagram of the electronic key telephone system shown in FIG. 1.
Figure 3:
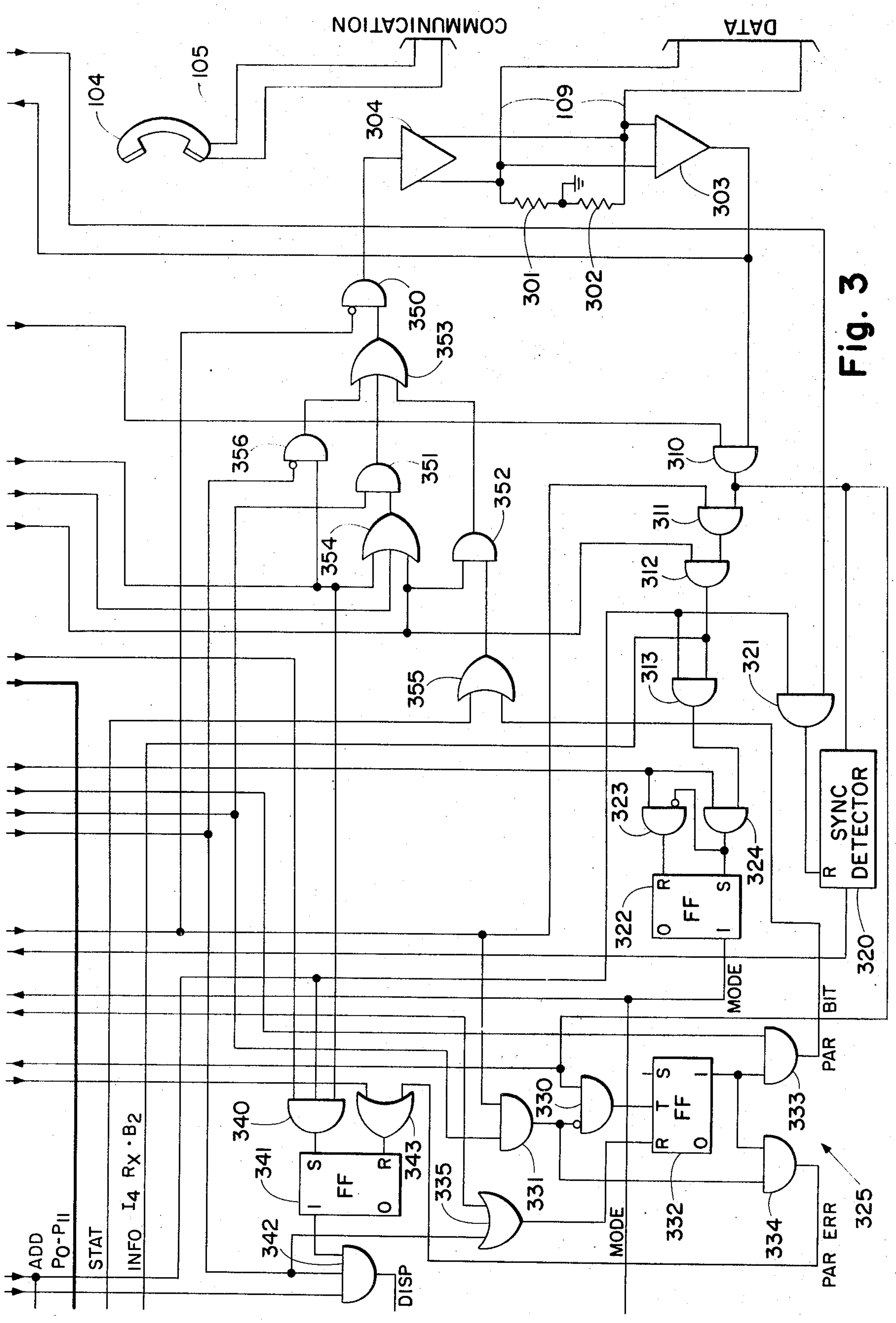
Figure 4A:
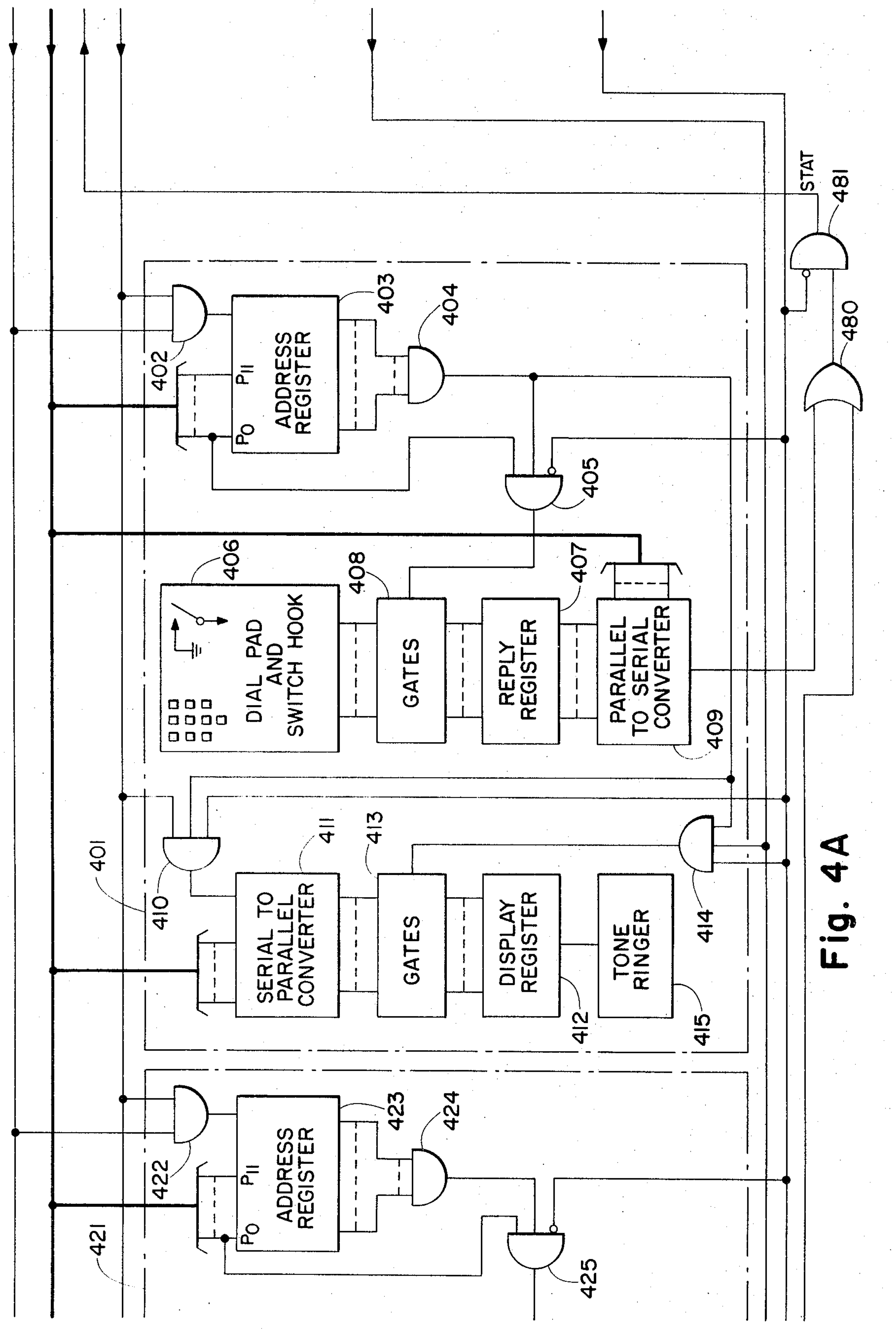
Figure 4B:
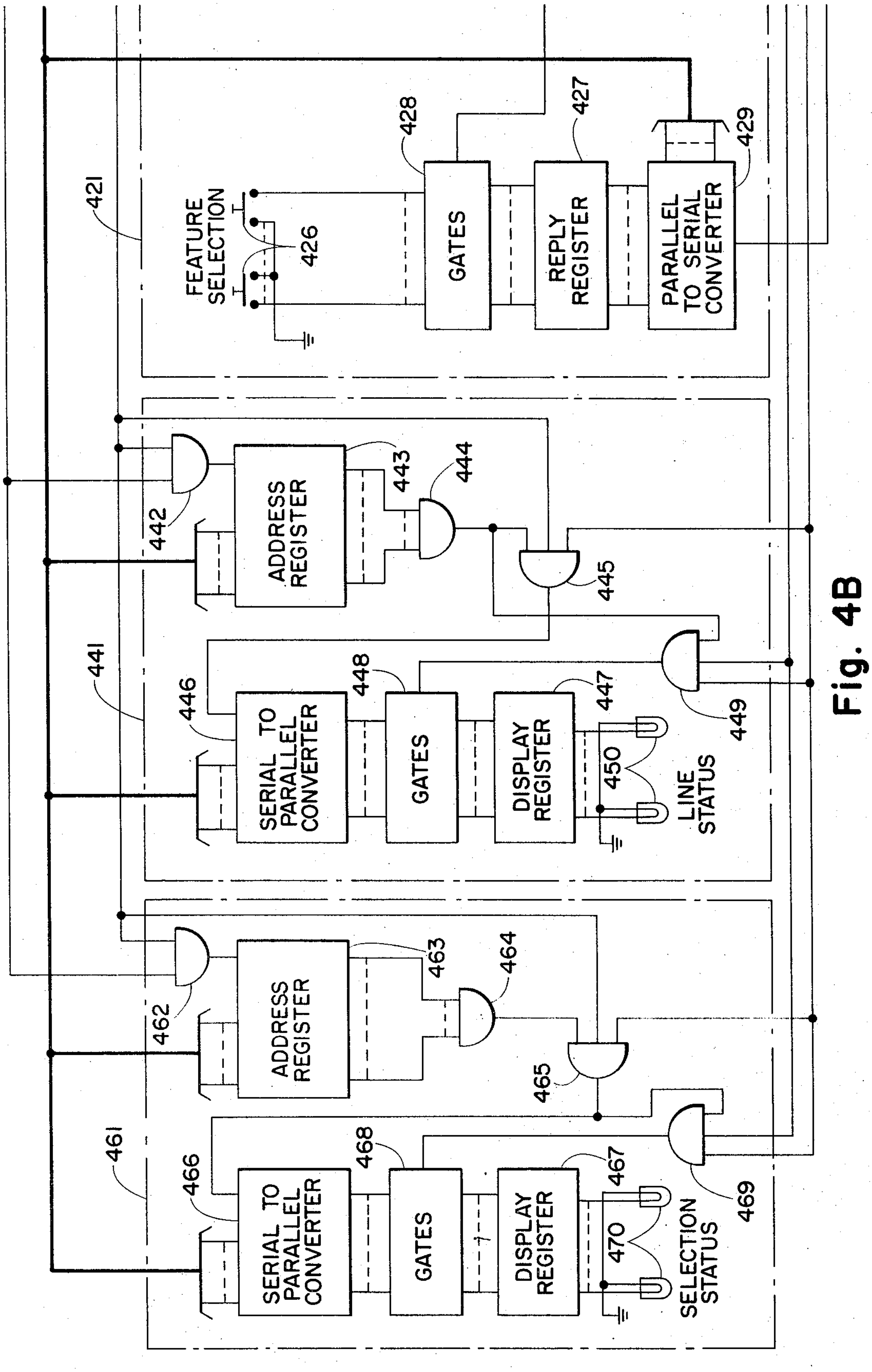

Each of the station sets 101 is basically identical and hence the structure and operation of only one of the sets will be described in detail. Basically, FIG. 2 illustrates in greater detail the timing control unit 110; FIG. 3 illustrates the data transceiver 108 and the status encoding and decoding unit 107; and FIGS. 4A and 4B illustrate the line and key selection and display multiplex/demultiplex unit 106, all illustrated in FIG. 1.

Referring to FIG. 2, all timing pulses are derived from a unity mark-space ratio clock 201 having an output frequency of 10 MHz with a stability of 5% over the full operating temperature range. The output signal (CLOCK) of the clock 201 is coupled through an AND gate 202 and is nominally divided by eight in a three-stage counter 203, the outputs of which are then decoded in a decoder 204 to yield an initial pulse $I_0$ and a strobe pulse $I_4$.

During the receive mode of the station set 101, the counter 203 is reset from the output of an AND gate 205 whenever the incoming bits change from a "1" to a "0" to maintain synchronism between digits transmitted from the central control unit 103 and received by the station set 101.

The initial pulse $I_0$ from the output of the decoder 204 is used to drive a two-stage counter 210, the outputs of which are decoded in a decoder 211 to generate the bit pulses $B_0$, $B_1$, $B_2$ and $B_3$. The two-stage counter 210 is reset from the output of an OR gate 212, one input of which is obtained from an AND gate 213 which is inhibited during $P_{13}$. This causes the counter 210 to reset at the beginning of $B_3$ except during $P_{13}$. The counter 210 also resets on $P_{14} \cdot B_1$ when receiving (RX) in MODE "1" and when transmitting (TX) in MODE "0."

Figure 9:
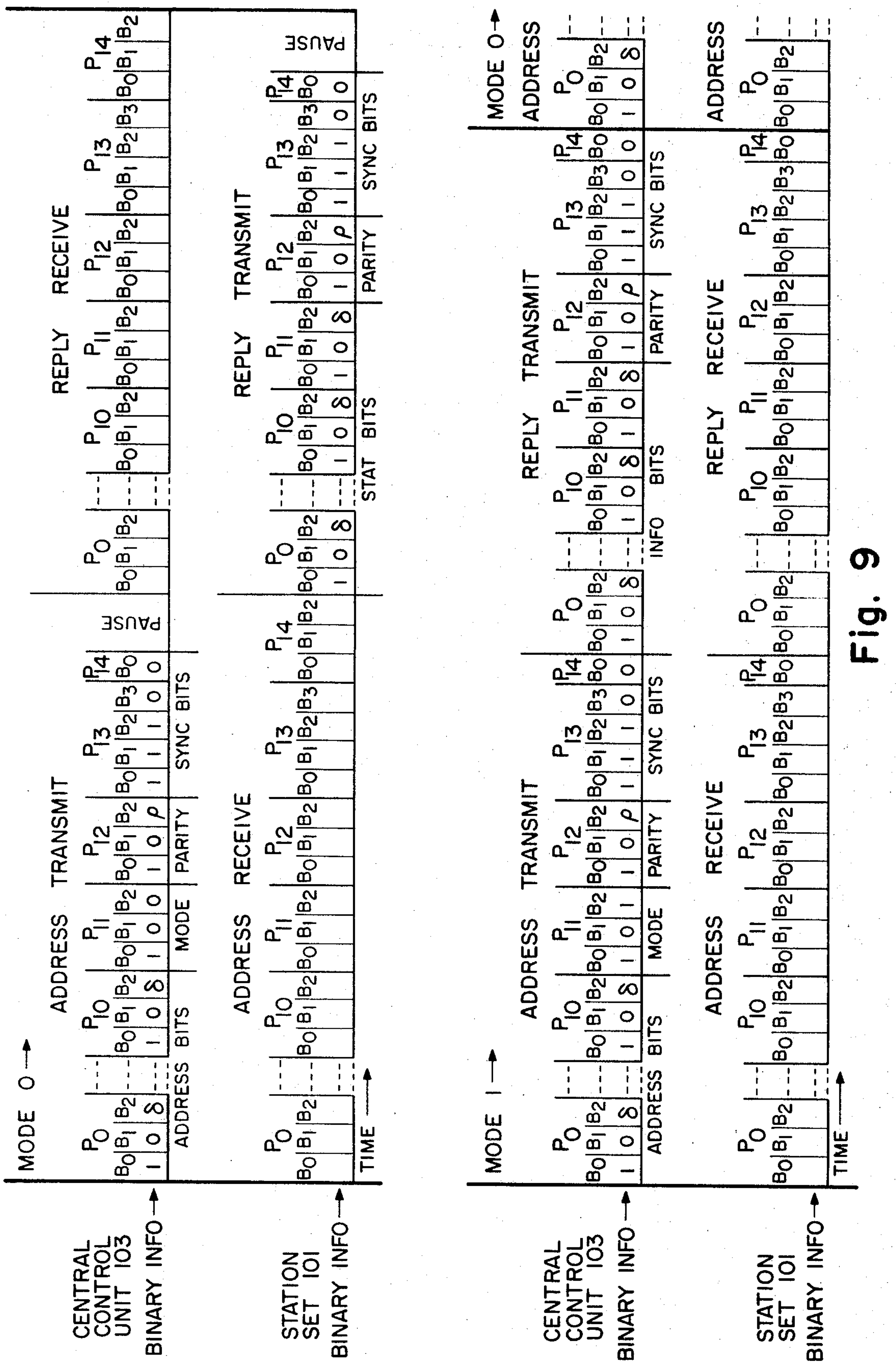
FIG. 9 is a diagram of the pulse sequence with respect to time utilized in the electronic key telephone system illustrated in FIG. 1.

The $\overline{2}$ output of the counter 210 is used to drive a four-stage counter 220, the outputs of which are decoded in a decoder 221 to provide the word pulses $P_0$ through $P_{15}$. The four-stage counter 220 is reset from the output of an OR gate 222 one input of which is fed from an AND gate 223 which resets on $P_{14} \cdot B_1$ when receiving in MODE "1" and when sending in MODE "0." This latter input is derived from a NAND gate 224 which has as its inputs $\overline{MODE}$ and RX signals. This output signal from the OR gate 222 is also used to reset the two-stage counter 210. When receiving in MODE "0," the counter runs through $P_{14}$, resetting on $P_{15} \cdot B_0$. This insures a minimum pause of 2 B's exists between the end of the address/receive (ADD/RX) portion of the cycle originating in the central control unit 103 and the reply/transmit (REP/TX) portion of the cycle originating in the station set 101, to allow the central control unit 103 to reset to the start of the reply/receive (REP/RX) mode before the station set data arrives, as indicated in FIG. 9.

Each time the four-stage counter 220 is reset, the $\overline{8}$ output drives the T input of an RST flip flop 230 to produce alternate ADD and REP signals at its 1-0 outputs respectively. Resetting of the flip flop 230 from either the T or R inputs when the station set 101 is in the transmit mode ($\overline{RX}$) produces an output signal from an AND gate 231 which actuates a RST flip flop 232 the zero output of which then inhibits the AND gate 202. This generates the PAUSE interval at the station set 101 as shown in FIG. 9. Incoming information from the central control unit 103 resets the flip flop 232 thereby allowing the CLOCK signal to again drive the three-stage counter 203.

AND gates 240, 241, 242, 243, 244 and 245 co-act with OR gates 246, 247 and 248 to act on input signals $B_0$, $B_1$, $B_3$, $P_{13}$ and $INFO \cdot I_4$ to generate a sync error signal (SYNC ERR) at the output of an RS flip flop 249 whenever:

a "1" is not received in $B_0$ or $P_{13} \cdot B_1$, an "0" is not received during $B_1$ (except during $P_{13}$) or $P_{13} \cdot B_3$.

The setting of the flip flop 249 forces the flip flop 230 into an address mode (ADD) to await the receipt of new information. The SYNC signal will also produce a $SYNC \cdot \overline{P_{14}}$ signal from the output of an AND gate 250 unless it occurs during $P_{14}$. Thus the absence of this signal indicates the reception of the SYNC signal at the correct time sequence. Generation of the $SYNC \cdot \overline{P_{14}}$ signal resets the flip flop 230 thus placing the station set in the REP mode, and also inhibits the AND gate 202 thus stopping the generation of the control signals.

Also shown in FIG. 2 is a NAND gate 251 which is responsive to a REP signal from the flip flop 230, a SYNC ERR signal from the flip flop 249 and a MODE "1" signal and that produces a receive signal (RX). This assures that the station set 101 remains in a receive condition except during the REP/TX/MODE "0" portion of the cycle.

Referring to FIG. 3, the telephone handset 104 is connected to the single communication line 105 as in FIG. 1. In addition, the data line 109 terminates in a pair of balanced resistors 301 and 302 across which is connected the input of a receive amplifier 303 and the output of a transmit amplifier 304. Serial information (INFO) is derived from the output of the receive amplifier 303 and is then gated by the strobe pulse $I_4$ in an AND gate 310 to generate $INFO \cdot I_4$. This signal is then gated by the RX signal in an AND gate 311 to produce $INFO \cdot I_4 \cdot RX$. This output signal is, in turn, gated by $B_2$ in an AND gate 312 to produce an output signal $INFO \cdot I_4 \cdot RX \cdot B_2$. Finally, this signal is gated by the ADD signal in an AND gate 313 to produce $INFO \cdot I_4 \cdot RX \cdot B_2 \cdot ADD$.

The output of the AND gate 310 is fed to a sync detector 320 which, whenever it sequentially receives binary information 11100, produces a synchronization output signal (SYNC). This signal normally occurs during $P_{13}$ and $P_{14}$. However, should it erroneously occur at any other time, a SYNC ERR signal will be generated as explained above with reference to FIG. 2. The SYNC signal remains until the detector 320 is reset by the ADD and CLOCK signals which are gated through an AND gate 321.

The output of the AND gate 313 is used to drive both the S and R inputs of a flip flop 322 via AND gates 323 and 324 which are gated during $P_{11}$ to produce a MODE signal at the "1" output. The MODE signal determines whether or not the station set 101 goes into the reply/transmit mode or remains in the reply/receive mode as explained above with reference to FIG. 9.

A parity generator/checker, generally 325, is utilized in order to check the validity of the transmitted and received signals. When the total number of 1 bits transmitted in an ADD or REP cycle from $P_0 \cdot B_0$ to $P_{12} \cdot B_1$ inclusive is even, a "0" is transmitted for the parity bit $\rho$ during $P_{12} \cdot B_2$. Conversely, when the total number of 1 bits transmitted from $P_0 \cdot B_0$ to $P_{12} \cdot B_1$ is odd, a "1" is transmitted for the parity bit $\rho$ during $P_{12} \cdot B_2$. In both instances the total number of transmitted pulses is even.

All information, whether transmitted or received over the data link 109, is coupled to the input of the receiver amplifier 303. This information (INFO $\cdot I_4$) when gated through the AND gate 310 is coupled to one input of an AND gate 330. The other input receives an inhibit signal during RX $\cdot P_{13}$ from an AND gate 331. The output of the AND gate 330 is fed to the T input of an RST flip flop 332 so that it is stepped every time a "1" is transmitted or received. At the end of $P_{12} \cdot B_1$ the flip flop indicates whether the total number of "1"s is odd or even. If odd, a parity bit (PAR BIT) is generated at the output of an AND gate 333 during the balance of $P_{12}$.

During RX $\cdot P_{13}$, the T input to the flip flop 332 is inhibited and if it indicates odd parity, a parity error signal (PAR ERR) is generated at the output of AND gate 334. The RST flip flop 332 is reset by either PAUSE or $P_{14}$ signals which are coupled through an OR gate 335 to the R input of the flip flop 332.

Signals $B_0$, $P_0$ and ADD are coupled through an AND gate 340 to the set input of an RX flip flop 341. This produces a "1" output which is gated by signals $P_{14}$ and REP to produce a display signal (DISP) at the output of an AND gate 342. The flip flop 341 is reset by SYNC ERR or PAR ERR signals coupled through an OR gate 343, which signals are received during any portion of the address or reply cycles. This inhibits the DISP signal at the output of the AND gate 342 if any form of error signal is detected.

AND gates 350, 351, 352 and 356, and OR gates 353, 354 and 355 co-act with signals $B_0$, $B_1$, $B_2$, $P_{13}$, $P_{14}$, PAR BIT, STAT and RX signals to produce a data bit stream, which is fed to the input of the transmit amplifier 304, as follows:

A "1" is transmitted in all $B_0$'s (except during $P_{14} \cdot B_0$);

A "1" is transmitted in $P_{13} \cdot B_0$, $P_{13} \cdot B_1$ and $P_{13} \cdot B_2$;

A "0" is transmitted in all $B_1$'s (except during $P_{13} \cdot B_1$), and in $P_{13} \cdot B_3$;

STAT information is transmitted in $B_2$ during $P_0$ to $P_{11}$; and

PAR BIT signals are transmitted during $P_{12} \cdot B_2$.

The AND gate 350 which is gated by a $\overline{RX}$ signal, inhibits the transfer of the data stream to the amplifier 304 except during the transmit portion of the cycle.

Referring to FIGS. 4A and 4B, the selection and display multiplex/demultiplex unit is divided into the following:

a dial pad and switch hook selection and tone ringer unit 401, a feature selection unit 421, a line status lamps unit 441, and a selection status lamps unit 461.

As described above, with particular reference to FIG. 9, the transmission of a MODE "0" bit during $P_{11}$ from the central control unit 103 causes the station set 101 to go into a reply/transmit mode following the address/receive portion of the cycle. The specific address which is transmitted determines what information is requested and hence transmitted back to the central control unit 103.

Conversely, if a MODE "1" signal is transmitted during $P_{11}$, the station set 101 goes into a reply/receive mode following the reception of the complete address from the central control unit 103. Consequently, reply/transmit information is then conveyed from the central control unit 103 to the station set 101 where, depending upon the specific address, it is displayed or otherwise utilized at the station set 101.

Referring more specifically to the dial pad and switch hook selection and tone ringer unit 401, received information INFO $\cdot I_4 \cdot$ RX $\cdot B_2$ is gated by ADD signals during the address/receive portion of the cycle from an AND gate 402 into an ADDRESS register 403 together with control signals $P_0$–$P_{11}$. The first 11 bits of received information $P_0$–$P_{10}$ contain the address of the block of data. The output of the register 403 is decoded in an AND gate 404 to produce a control signal upon receipt of the correct address. Following an address requesting status information from the station set 101, this signal is then gated by $P_0$ and MODE "0" signals in an AND gate 405 to produce a gate control signal. Actuation of a pushbutton or switch hook in a dial pad and switch hook unit 406 produces one or more signals which are gated into a reply register 407 by gates 408 that are controlled by the gate control signal from the AND gate 405. The information in the reply register 407 is then converted to serial information in a parallel to serial converter 409 under control of control signals $P_0$–$P_{11}$.

If status information is to be transmitted to the station set 101 following the address/receive portion of the cycle, a MODE "1" signal is received by the station set 101 and the set 101 goes into a reply/receive mode. Consequently, data in the information stream, received during the reply/receive mode, is gated by an AND gate 410 into a serial to parallel converter 411 during $P_0$–$P_{11}$. The parallel information from the converter 411 is then gated into a display register 412 through gates 413 which are controlled by a control signal from an AND gate 414 during the MODE/DISP portion of the cycle upon decoding the correct address in the AND gate 404. The information in the display register 412 in turn is utilized to control a tone ringer 415 in a conventional manner.

As manifest above, the control signal from the AND gate 404 together with the MODE signal is used to gate dial pad and switch hook status information into the parallel to serial converter 409 during MODE "0" and to gate tone ringer information into the display register 415 during MODE "1."

Referring more specifically to the feature selection unit 421, received information INFO · $I_4$ · RX · $B_2$ is also gated by ADD signals during the address/receive portion of the cycle from an AND gate 422 into an address register 423 together with control signals $P_0$–$P_{11}$. The first eleven bits of received information $P_0$–$P_{10}$ contain the address of the block of data. The output of the register 423 is decoded in an AND gate 424 to produce a control signal upon receipt of the correct address. Following a request for status information from the station set 101, this signal is then gated by $P_0$ and MODE "0" signals in an AND gate 425 to produce a gate control signal. Actuation of any one of the plurality of feature selection buttons 426 produces a signal which is gated into a reply register 427 by gates 428 that are controlled by the control signal from the AND gate 425. The information in the reply register 427 is then converted to serial information in a parallel to serial converter 429 under control of control signals $P_0$ $P_{11}$.

The output signals from the parallel to serial converter 409 and 429 are coupled through an OR gate 480 and are then gated by MODE "0" signals in an AND gate 481 to provide the status information (STAT) which is then transmitted to the central control unit 103, as explained above.

Referring more specifically to line status lamps unit 441, received information INFO · $I_4$ · RX · $B_2$ is gated by ADD signals during the address/receive portion of the cycle from an AND gate 442 into an address register 443 together with control signals $P_0$–$P_{11}$. Again, the first eleven bits of received information $P_0$–$P_{10}$ contain the address of the block of data. The output of the register 443 is decoded in an AND gate 444 to produce a control signal upon receipt of the correct address. Following this, line status information is transmitted from the central control unit 103 to the station set 101. The control signal together with the MODE "1" signal gates the received information from an AND gate 445 into a serial to parallel converter 446 during $P_0$–$P_{11}$. The parallel information from the converter 446 is then gated into a display register 447 through gates 448 which are controlled by MODE/DISP/CONTROL signals in a control signal AND gate 449. Information in the display register 447 in turn is utilized to control line status lamps 450 in a conventional manner.

Referring more specifically to selection status lamps unit 461, received information INFO · $I_4$ · RX · $B_2$ is gated by ADD signals during the address/receive portion of the cycle from an AND gate 462 into an address register 463 together with control signals $P_0$–$P_{11}$. Again, the first eleven bits of received information $P_0$–$P_{10}$ contain the address of the block of data. The output of the register 463 is decoded in an AND gate 464 to produce a control signal upon receipt of the correct address. Following this, selection status information is transmitted from the central control unit 103 to the station set 101. The control signal together with the MODE "1" signal gates the received information from an AND gate 465 into a serial to parallel converter 466 during $P_0$–$P_{11}$. The parallel information from the converter 466 is then gated into a display register 467 through gates 468 which are controlled by MODE/DISP/CONTROL signals in a control signal AND gate 469. Information in the display register 467 in turn is utilized to control line selection lamps 470 in a conventional manner.

As is evident from the above, separate line status lamps 450 and selection status lamps 470 are utilized at each station set 101 to indicate the feature selection. In a typical system, line status information would be displayed on the status lamps 450 at all station sets 101 utilizing the particular feature selection. However, selection status information would be displayed on the selection status lamps 470 at only the particular station set 101 making the request. Consequently, the need for only simple mechanical feature selection buttons 421 is required at each station set 101, as opposed to complex mechanically intercoupled buttons now used on present sets, in order to provide both feature selection and line selection status information.

It is evident that additional forms of display information can be readily handled by the present system simply by adding additional units in shunt with the present units 401, 421, 441 and 461. Each of these additional units would have their own unique address and can be utilized as a source of information such as binary or decimal information for a computer, or as a display unit for displaying the decimal output of a calculating machine.

DESCRIPTION OF THE CENTRAL CONTROL UNIT

Figure 5:
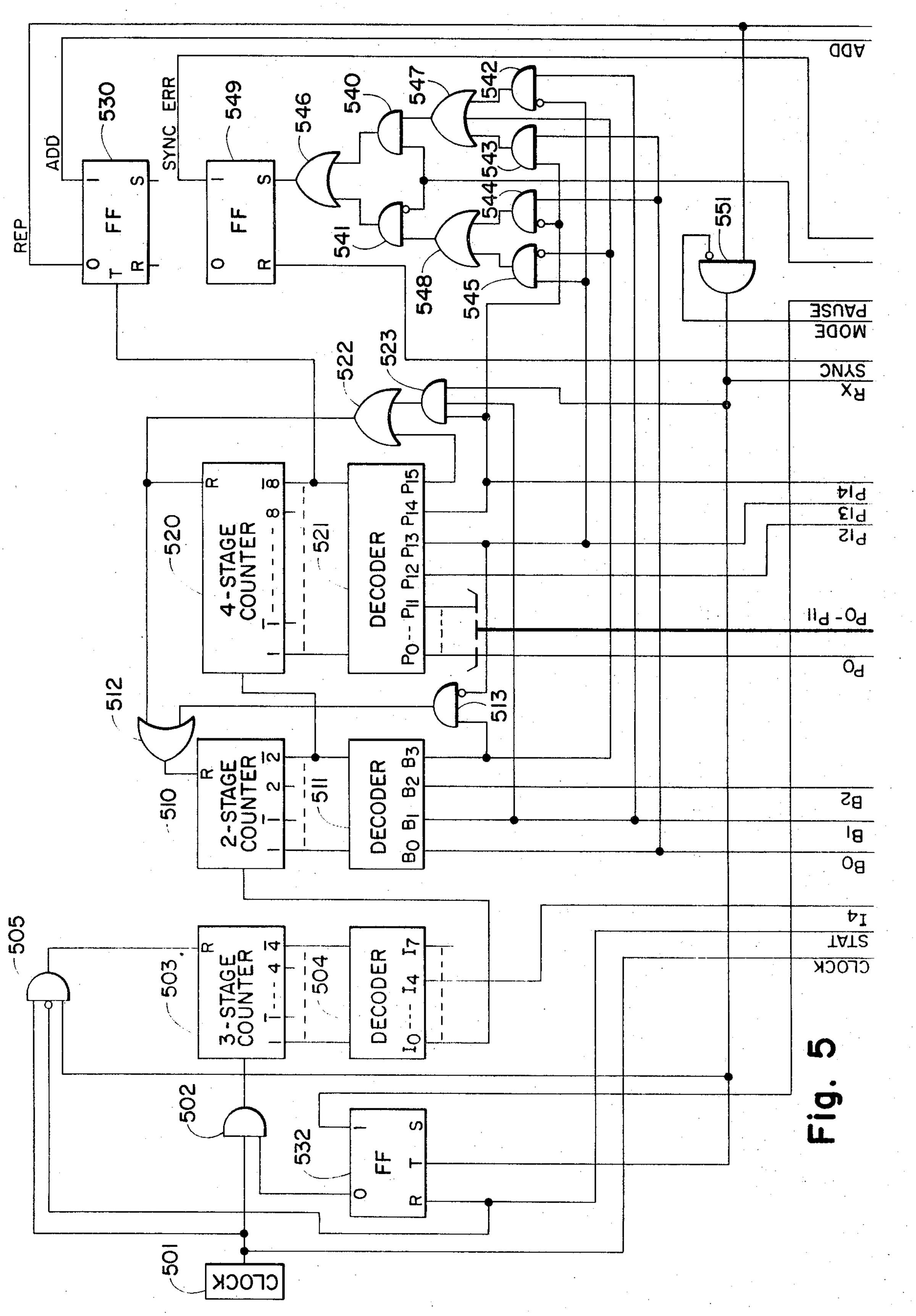
Figure 6:
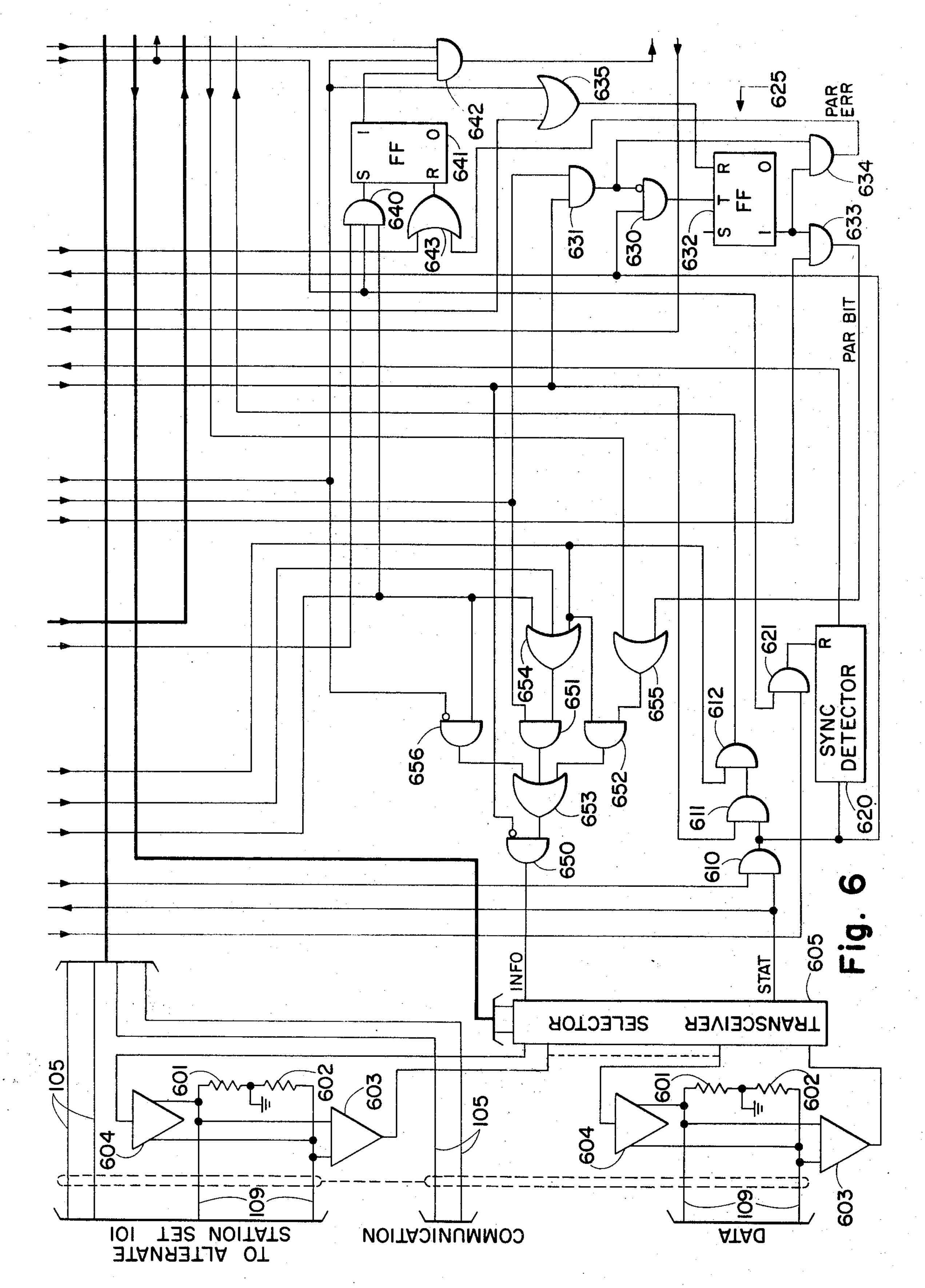
Figure 7:
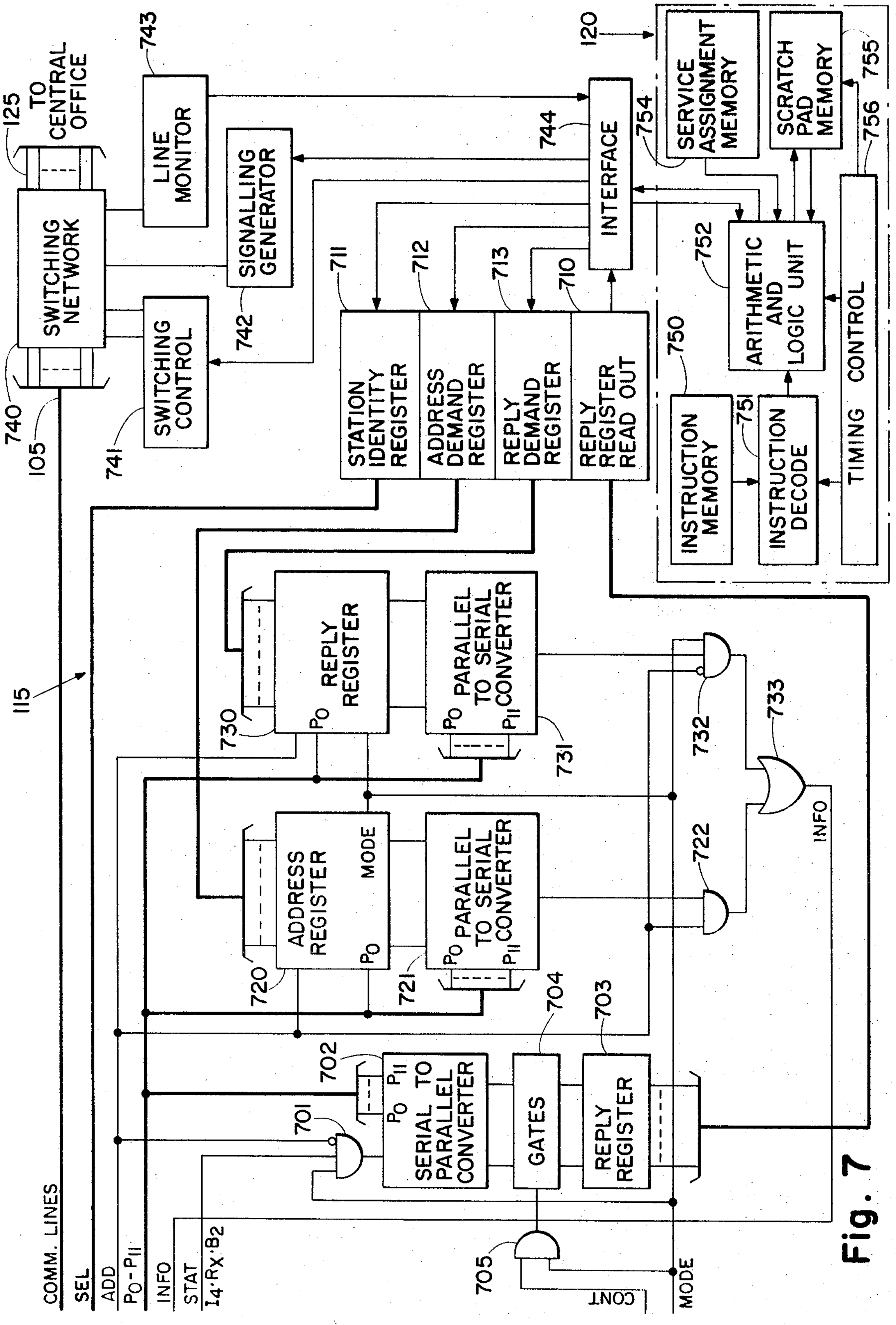

Information from the central control unit 103 is fed separately to a selected one of the station sets 101. The information generating and receiving portions of the central control unit 103 are common to all station sets 101 to which it is connected. Basically, FIG. 5 illustrates in greater detail the timing and control unit 116; FIG. 6 illustrates the data transceiver and transceiver selector 113; and FIG. 7 illustrates the data multiplex/demultiplex and control unit 115, data encoding and decoding unit 114 and the central control processor 120, all illustrated in FIG. 1. In the foregoing description, information received at the station set 101 was designated INFO whereas information to be transmitted from it was designated STAT. In order to be consistant, information received at the central control unit 103 will be designated STAT whereas information to be transmitted will be designated INFO.

Referring to FIG. 5, all timing pulses are derived from a unity mark-space ratio clock 501 having an output frequency of 10 MHz with a stability of 5% over the full operating temperature range. The output signal (CLOCK) of the clock 501 is coupled through an AND gate 502 and is nominally divided by eight in a three-stage counter 503, the outputs of which are then decoded in a decoder 504 to yield an initial pulse $I_0$ and a strobe pulse $I_4$. from the During the receive mode of the central control unit 103, the counter 503 is reset from the output of an AND gate 505 whenever the incoming bits change from a "1" to a "0" to maintain synchronism between digits transmitted from the station set 101 and received by the central control unit 103.

The initial pulse $I_0$ from the output of the decoder 504 is used to drive a two-stage counter 510, the outputs of which are decoded in a decoder 511 to generate the bit pulses $B_0$, $B_1$, $B_2$ and $B_3$. The two-stage counter 510 is reset fromthe output of an OR gate 512, one input of which is obtained from an AND gate 513. This causes the counter 510 to reset at the beginning of $B_3$ except during $P_{13}$. The counter 510 also resets on $P_{14} \cdot B_1$ when transmitting (TX) in both MODE "0" and MODE "1."

The $\bar{2}$ output of the counter 510 is used to drive a four-stage counter 520, the outputs of which are decoded in a decoder 521 to provide the word pulses $P_0$ through $P_{15}$. The four-stage counter 520 is reset from the output of an OR gate 522 one input of which is fed from an AND gate 523 which resets on $P_{14} \cdot B_1$ when transmitting (TX) in both MODE "0" and MODE "1." This output signal from the OR gate 522 is also used to reset the two-stage counter 510. When receiving in MODE "0," the counter runs through $P_{14}$, resetting on $P_{15} \cdot B_0$. This insures a minimum pause of 2 B's exist between the end of the reply/receive (REP/RX) portion of the cycle originating in the station set 101 and the following address/transmit (ADD/TX) portion of the cycle originating in the central control unit 103, to allow the station set 101 to reset to the start of the address/receive (ADD/RX) mode before the central control unit data arrives, as indicated in FIG. 9.

Each time the four-stage counter 520 is reset, the $\bar{8}$ output drives the T input of an RST flip flop 530 to produce alternate ADD and REP signals at its 1-0 outputs respectively. Resetting of the flip flop 530 when the central control unit 103 is in the transmit mode ($\overline{RX}$) produces an output signal which actuates an RST flip flop 532, the zero output of which then inhibits the AND gate 502. This generates the PAUSE interval at the central control unit 103 as shown in FIG. 9. Incoming status data (STAT) from the station set 101 resets the flip flop 532 thereby allowing the CLOCK signal to again drive the three-stage counter 503.

AND gates 540, 541, 542, 543, 544 and 545 co-act with OR gates 546, 547 and 548 to act on input signals $B_0$, $B_1$, $B_3$, $P_{13}$ and STAT $\cdot$ $I_4$ to generate a sync error signal (SYNC ERR) at the output of an RS flip flop 549 whenever:

a "1" is not received in $B_0$ or $P_{13} \cdot B_1$, an "0" is not received during $B_1$ (except during $P_{13}$) or $P_{13} \cdot B_3$.

The SYNC signal resets the flip flop 549.

Also shown in FIG. 5 is an AND gate 551 which is responsive to a REP signal from the flip flop 530, and a MODE "0" signal and that produces a receive signal (RX). This assures that the central control unit 103 remains in a receive condition during the REP/RX-/MODE "0" portion of the cycle.

Referring to FIG. 6, the data lines 109 from each of the station sets 101, terminate in a separate pair of balanced resistors 601 and 602 across which are connected the input of separate receive amplifiers 603 and the output of separate transmit amplifiers 604. The inputs of the receive amplifiers 603 and the output of the transmit amplifiers 604 are connected to a transceiver selector 605 which, in response to control signals, selects the particular station set 101 to which data is to be sent and received. Status information (STAT) is derived from the output of the selected receive amplifier 603 and is then gated by the strobe pulse $I_4$ in an AND gate 610 to generate STAT $\cdot$ $I_4$. This signal is then gated by the RX signal in an AND gate 611 to produce STAT $\cdot$ $I_4$ $\cdot$ RX. This output signal is, in turn, gated by $B_2$ in an AND gate 612 to produce an output signal STAT $\cdot$ $I_4$ $\cdot$ RX $\cdot$ $B_2$.

The output of the AND gate 610 is fed to a sync detector 620 which, whenever it sequentially receives binary information 11100, produces a synchronization output signal (SYNC). This signal normally occurs during $P_{13}$ and $P_{14}$. However, should it erroneously occur at any other time, a SYNC ERR signal will be generated as explained above with reference to FIG. 5. The SYNC signal remains until the detector 620 is reset by the ADD and CLOCK signals which are gated through an AND gate 621.

A parity generator/checker, generally 625, is utilized in order to check the validity of the transmitted and received signals. When the total number of "1" bits transmitted in an ADD or REP cycle from $P_0 \cdot B_0$ to $P_{12} \cdot B_1$ inclusive is even, a "0" is transmitted for the parity bit $\rho$ during $P_{12} \cdot B_2$. Conversely, when the total number of "1" bits transmitted from $P_0 \cdot B_0$ to $P_{12} \cdot B_1$ is odd, a "1" is transmitted for the parity bit $\rho$ during $P_{12} \cdot B_2$. In both instances, the total number of transmitted pulses is even.

All information, whether transmitted or received over the data link 109, is coupled to the input of the receiver amplifier 603. This information (STAT $\cdot$ $I_4$) when gated through the AND gate 610 is coupled to one input of an AND gate 630. The other input receives an inhibit signal during RX $\cdot$ $P_{13}$ from an AND gate 631. The output of the AND gate 630 is fed to the T input of an RST flip flop 632 so that it is stepped every time a "1" is transmitted or received. At the end of $P_{12} \cdot B_1$ the flip flop indicates whether the total number of "1"'s is odd or even. If odd, a parity bit (PAR BIT) is generated at the output of an AND gate 633 during the balance of $P_{12}$.

During RX $\cdot$ $P_{13}$, the T input to the flip flop 632 is inhibited and if it indicates odd parity, a parity error signal (PAR ERR) is generated at the output of AND gate 634. The RST flip flop 632 is reset by either PAUSE or $P_{14}$ signals which are coupled through an OR gate 635 to the R input of the flip flop 632.

Signals $B_0$, $P_0$ and ADD are coupled through an AND gate 640 to the set input of an RS flip flop 641. This produces a "1" output which is gated by signals $P_{14}$ and REP to produce a control signal (CONT) at the output of an AND gate 642. The flip flop 641 is reset by SYNC ERR or PAR ERR signals coupled through an OR gate 643, which signals are received during any portion of the address or reply cycles. This inhibits the CONT signal at the output of the AND gate 642 if any form of error signal is detected.

AND gates 650, 651, 652 and 656, and OR gates 653, 654 and 655 co-act with signals $B_0$, $B_1$, $B_2$, $P_{13}$, $P_{14}$, PAR BIT, INFO and RX signals to produce a data bit stream, which is fed to the input of the selected transmit amplifier 604, as follows:

a "1" is transmitted in $B_0$ (except during $P_{14} \cdot B_0$);

a "1" is transmitted in $P_{13} \cdot B_0$, $P_{13} \cdot B_1$ and $P_{13} \cdot B_2$;

a "0" is transmitted in all $B_1$'s (except during $P_{13} \cdot B_1$) and in $P_{13} \cdot B_3$;

INFO information is transmitted in $B_2$ during $P_0$ to $P_{11}$; and

PAR BIT signals are transmitted during $P_{12} \cdot B_2$.

The AND gate 650 which is gated by a $\overline{RX}$ signal, inhibits the transfer of the data stream to thee selected amplifier 604 except during the transmit portion of the cycle.

Referring to FIG. 7, the heart of the central control unit 103 is the central control processor 120 which interfaces with the central switching network, generally 102, and the data multiplex/demultiplex and control unit, generally 115. Status information STAT · $I_4$ · RX · $B_2$ received from the station sets 101 is gated in an AND gate 701 by $\overline{\text{ADD}}$ and MODE signals into a serial to parallel converter 702 under control of timing pulses $P_0 - P_{11}$. The output of the converter 702 is fed to a reply register 703 through gates 704 which are under control of the output of an AND gate 705 having as its inputs MODE and CONT signals. This information is then fed from the reply register 703 to a reply register readout 710.

A station identity register 711 under control of the central control processor 120 feeds information to the selector 605 in FIG. 6 to control the routing of the INFO and STAT information to the various station sets 101. In addition, an address demand register 712 and a reply demand register 713 both under control of the central control processor 120 feed information to the data multiplex/demultiplex and control unit 115. Address information from the register 712 is fed to an address register 720 which is then converted into serial information (time division multiplexed) in a parallel to serial conerter 721 under control of signals $P_0 - P_{11}$. The output of the converter 721 is gated by ADD signals in an AND gate 722. Information from the reply demand register 713 is fed to a reply register 730 which is then coupled to a parallel to serial converter 731 under control of signals $P_0 - P_{11}$. The output of the converter 731 is then gated by $\overline{\text{ADD}}$ and MODE signals in an AND gate 732. The output of the two AND gates 722 and 732 is combined in an OR gate 733 to produce the INFO signal which is then transmitted to the station sets 101 as hereinbefore explained.

The central switching unit 102 includes a conventional switching network 740 which is controlled by a switching control unit 741. The switching network 740 is utilized to connect the incoming communication lines 105 either to each other or to those lines 125 going to the central office in a well known manner. The network 740 may also include standard hold circuit and conference circuit facilities all under control of the switching control unit 741. The central switching network 102 also includes signalling generator 742 which provides outgoing dial pulses or signalling tones on the lines 125 as well as dial and busy tones which are transmitted to the handsets 104 in the station sets 101. Also included in the central switching network 102 is a line monitor 743 for detecting incoming ringing tones on the lines 125.

Information from the registers 710, 711, 712 and 713 and the units 741, 742 and 743 is coupled through an interface unit 744 to the central control processor 120.

The central control processor 120 includes a permanent instruction memory 750 which stores the sequence of control steps (instructions) to be performed. Information in the instruction memory 750 is fed to an instruction decode unit 751 which then translates the information to direct operations within the arithmetic and logic unit 752. The central control processor 120 also includes a service assignment memory 754 which stores all semi-permanent information such as to which of lines 125 a particular selection key 426 refers. The output of the service assignment memory 754 is coupled to the arithmetic and logic code unit 753. A scratch pad memory 755 performs all transitory functions on information transmitted to and from the arithmetic and logic code unit 753. Each of the units 752, 753 and 755 is under control of a timing control unit 756, also located in the central control processor 120. The design and operation of each of the units in the central control processor 120 and alternative methods of achieving the same results are well known to those skilled in the electronic switching art.

In the above-described embodiment, the sync code was transmitted at the end of both the address and reply cycles. It is evident that with modifications to the circuitry, this code could be transmitted at the beginning of each of the data cycles. In addition, the present embodiment describes a system which transmits two synchronization bits followed by an information bit thus: 1, 0, δ; where δ is the information bit (either a "1" or a "0"). By altering the circuitry to transmit sequentially either a "1-0" (representing a "1") or a "0-1" (representing a "0"), the transmission of both bit synchronization and information data could be achieved utilizing only two bits of information rather than three. This would substantially reduce the bandwidth requirements of the system without altering other parameters.

What is claimed is:

1. A key telephone system for connection to a plurality of telephone lines, comprising:

a plurality of telephone stations each including line selectors corresponding to individual ones of said lines;

central switching means and central control means;

each of the telephone stations being connected to the central switching means by a single communication path and also being connected to the central control means by a single data path;

said central control means including means for periodically transmitting over each of the single data paths an information to follow address or an information request address to a selected one of the telephone stations;

said central control means including means responsive to said information to follow address for transmitting central control status information to the selected station, and means responsive to said information request address for receiving station status information from the selected station via said single data path;

said central control means also including a memory for storing status information and means responsive to the station status information from said selected station for controlling said central switching means to connect the communications path of said selected station to one of said telephone lines;

each of the telephone stations including means for decoding the information to follow address and the information request address, means responsive to the information to follow address for conditioning the station in a receive mode, means responsive to the central control status information transmitted from the central control means for displaying the status at the selected station, and means responsive to said information request address for transmitting the station status information to the central control means over the single data path; and each of the telephone stations also including a switch hook independent of the communication path; and means responsive to the switch hook for transmitting the station status information to the central control means.

2. A key telephone system as defined in claim 1 in which the line selectors are functionally independent momentary actuated switches; and in which each of the line selectors is associated with a respective pair of status lights;

each of said telephone stations also including means responsive to the central control status information from the memory for actuating one of the pair of status lights to indicate the status of an individual line at all the stations, and for actuating the other of said pair of status lights to indicate the selection of a line at the same station.

3. A key telephone system as defined in claim 1 in which each of the telephone stations includes a pushbutton dial having means for encoding its output in the form of a digital output for transmission as station status information over the single data path connected to the respective station; and in which the central control means includes means for generating dial signals on each of said telephone lines, and means for controlling the dial signal generating means of a selected line in response to the station status information received from the digital output of one of the pushbutton dials.

4. A key telephone system as defined in claim 3 in which the means for encoding includes a pushbutton dial to binary code converter; and in which the central control unit includes a binary code to dial pulse converter.

5. A key telephone system as defined in claim 1 in which the means for periodically transmitting an information to follow address includes means for transmitting a mode bit to designate subsequent transmission of central control status information to the telephone stations and in which the means for periodically transmitting an information request address includes means to designate subsequent reception of station status information from the telephone stations.

* * * * *